C. T. SMALL.
CAN TURNING DEVICE.
APPLICATION FILED JAN. 15, 1914.
1,193,624.
Patented Aug. 8, 1916.
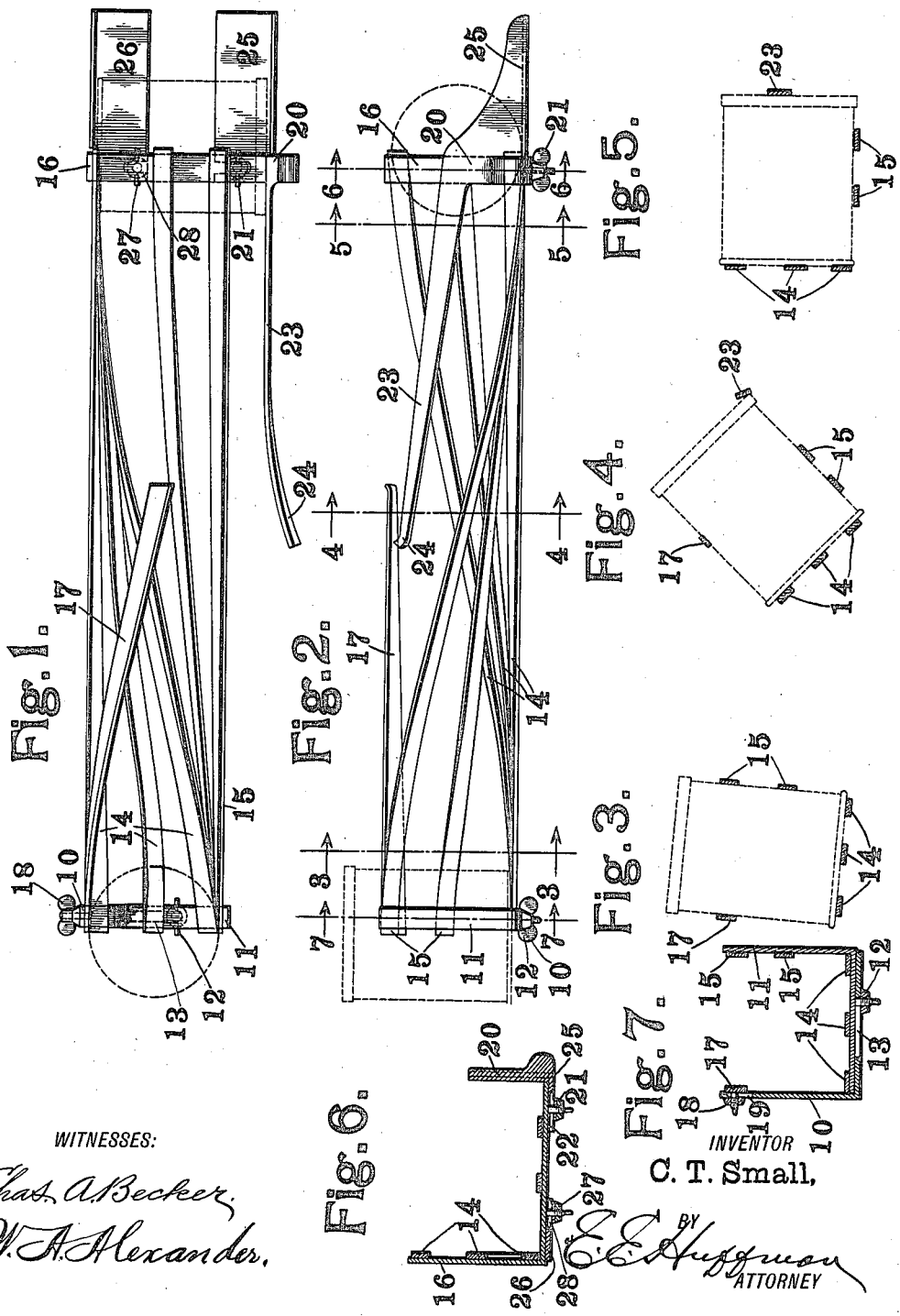
WITNESSES:
Chas. A. Becker
W. A. Alexander.
INVENTOR
C. T. Small,
BY
ATTORNEY

UNITED STATES PATENT OFFICE.

CHESLEY T. SMALL, OF ST. LOUIS, MISSOURI.

CAN-TURNING DEVICE.

1,193,624.   Specification of Letters Patent.   Patented Aug. 8, 1916.

Application filed January 15, 1914. Serial No. 812,237.

*To all whom it may concern:*

Be it known that I, CHESLEY T. SMALL, a citizen of the United States of America, residing at the city of St. Louis, State of Missouri, have invented a certain new and useful Can-Turning Device, of which the following is such a full, clear, and exact description as will enable any one skilled in the art to which it appertains to make and use the same, reference being had to the accompanying drawings, forming part of this specification.

My invention relates to a can turning device and more particularly to one consisting of a spiral trough corresponding in cross section to the shape of the can and to which the can is delivered in one position and from which it is delivered in another position.

In the accompanying drawings, which illustrate one form of can turning device made in accordance with my invention, Figure 1 is a top plan view; Fig. 2 is a side elevation; and Figs. 3, 4, 5, 6, and 7 are sectional views taken on the lines 3—3, 4—4, 5—5, 6—6 and 7—7 of Fig. 2, respectively.

Like marks of reference refer to similar marks in the several views of the drawings.

In the form of device I have shown, the can is turned through an arc of ninety degrees. It will be understood, of course, that my invention may be modified to move the can through a greater or less arc than ninety degrees.

In the form of device shown in the drawings, the receiving end of the trough is formed of two L-shaped brackets 10 and 11. These brackets are secured together by means of a thumb-nut 12, coöperating with a slot 13 so that the two brackets may be adjusted toward and away from each other to compensate for cans of varying diameters. The walls of the trough, which is spirally shaped, are formed of bars or slats so that any foreign material which may enter the trough will drop out and thus not impede the passage of the cans. The bottom wall of the trough, at the receiving end, is formed of three bars or slats 14. These bars 14 are twisted in a spiral form so that at the bottom of the discharge end of the trough, they form one of the lateral walls of the trough, namely, the left end wall when looking in the directions indicated by the arrows in the drawings. The right hand wall, at the receiving end, is formed of a pair of bars 15 which are twisted in a spiral form so as to form a bottom wall of the trough at the discharge end. The bars 14 and 15, at the discharge end of the device, are secured to an L-shaped bracket 16. The left hand wall of the trough at the receiving end is formed of a bar 17, which is secured to the bracket 10 by means of a thumb nut 18 coöperating with a slot 19 so that the said bar may be adjusted vertically. This bar 17 extends only through approximately one half the length of the trough and is curved in a manner similar to the bars 14 and 15 so as to coöperate with the side of the can opposite to the bars 15.

At the discharge end of the device, the bracket 16 has secured to it a bracket 20. This bracket 20 is secured to the bracket 26 by means of the thumb nut 21, coöperating with the wall 22, so as to adjust the bracket 20 toward and away from the vertical side of the bracket 16. This bracket 20 carries a finger 23 having an outwardly curved end 24, as best shown in Fig. 1. This finger 23 extends through substantially one-half of the length of the trough and is adapted to coöperate with the top of the can at about the time it passes out of engagement with the finger 17. The bracket 20 also carries a guide 25 to guide the cans on to a suitable conveyer, not shown. Another guide 26 similar to the guide 25 is secured to the bracket 16 at the opposite side of the device by means of a thumb-nut 27 coöperating with a slot 28. In order to adapt the device to cans of varying height, the finger 23, together with its attached guide 25 is adjusted toward and away from the vertical side of the bracket 16 by manipulating the thumb-nut 21.

The operation of my device will be obvious. The cans, indicated in dotted lines, are conveyed to the receiving end of the device by any suitable conveyer, not shown. The cans are forced through the conveyer by contact with each other, and as the conveyer corresponds in cross section with the shape of the can throughout its length and, at the same time, it turns through an angle of ninety degrees, the can which is received in an upright position, is delivered in a horizontal position.

It will be evident that by the various adjustments described, the device may be adapted to cans varying considerably in both diameter and height.

Having fully described my invention, what I claim as new and desire to secure by Letters-Patent of the United States is:

1. A can turning device comprising a spiral trough extending in a substantially straight line and conforming in cross section to the shape of the can and adapted to receive the can in one position and deliver it in another position, adjustable means extending throughout a portion only of the length of the trough for varying the size of the trough in the direction of one dimension of the can, and a second adjustable means also extending throughout only a portion of the length of the trough for varying the size of the trough in the direction of the other dimension of the can.

2. A can turning device comprising a spiral trough extending in a substantially straight line and conforming in cross section to the shape of the can and adapted to receive a can in one position and deliver it in another position, and means for adjusting one end of said trough to the diameter of the can and the other end of said trough to the height of the can.

3. A can turning device comprising a spiral trough, two sides of which are composed of walls extending from end to end of the trough, and the remaining sides of which are composed of members extending through only a portion of the length of the trough.

4. A can turning device comprising a trough having two continuous sides, one of said sides acting as a bottom at the receiving end and as one lateral wall at the discharge end, and the other side acting as a lateral wall at the receiving end and as a bottom at the discharge end, and a pair of fingers forming the remaining sides, each extending approximately one-half the length of the trough.

5. A can turning device comprising a trough having two continuous sides, one of said sides acting as a bottom at the receiving end, and as one lateral wall at the discharge end, and the other side acting as a lateral wall at the receiving end and as a bottom at the discharge end, and a pair of adjustable fingers forming the remaining sides, each extending approximately one-half the length of the trough.

In testimony whereof, I have hereunto set my hand and affixed my seal in the presence of the two subscribing witnesses.

CHESLEY T. SMALL. [L. S.]

Witnesses:
W. A. ALEXANDER,
G. M. SHORE.